(12) United States Patent
Lee

(10) Patent No.: US 6,668,879 B1
(45) Date of Patent: Dec. 30, 2003

(54) INFLATION VALVE DEVICE WITH A PRESSURE MEASURING UNIT FOR AN INFLATABLE BLADDER

(76) Inventor: Ming-Hsin Lee, 7F, No. 96, Sec. 3, Chung-Hsiao E. Rd., Taipei City (TW)

(*) Notice: Subject to any disclaimer, the term of this patent is extended or adjusted under 35 U.S.C. 154(b) by 0 days.

(21) Appl. No.: 10/210,564

(22) Filed: Jul. 31, 2002

(30) Foreign Application Priority Data

Jun. 17, 2002 (TW) .................................. 91209035 U

(51) Int. Cl.[7] .............................. B65B 1/04; F16K 15/20
(52) U.S. Cl. ........................ 141/329; 141/330; 137/227
(58) Field of Search ................................. 141/329, 330, 141/19, 98; 137/227

(56) References Cited

U.S. PATENT DOCUMENTS 1,577,243 A * 3/1926 Bridges ........................ 137/224
1,706,855 A * 3/1929 Larson et al. ............... 152/429
3,230,968 A * 1/1966 Struby ......................... 137/227

* cited by examiner

Primary Examiner—John Rivell
Assistant Examiner—Khoa D. Huynh
(74) Attorney, Agent, or Firm—Christensen O'Connor Johnson Kindness PLLC

(57) ABSTRACT

An inflatable bladder is provided with an inflation valve device that includes a sleeve member, a tubular indicator mounted movably in the sleeve member and marked with indicia for indicating internal pressure of the bladder, an inflation needle mounted in the indicator for inflation of the bladder, and an urging member disposed between the sleeve member and the indicator in such a manner that outward movement of the indicator resulting from the pressure difference between the pressure in the bladder and the atmospheric pressure results in displacement of the urging member, which is indicated by the indicia exposed from the bladder.

7 Claims, 8 Drawing Sheets

INFLATION VALVE DEVICE WITH A PRESSURE MEASURING UNIT FOR AN INFLATABLE BLADDER

BACKGROUND OF THE INVENTION

1. Field of the Invention

This invention relates to an inflation valve device with a pressure measuring unit for an inflatable bladder.

2. Description of the Related Art

FIG. 1 illustrates a-conventional inflatable bladder 10, such as a sports ball, with a peripheral wall 11 confining an air chamber 16 therein. An elastomeric one-way valve 13 is mounted in an opening 12 in the peripheral wall 11, and is formed with a slit 15 that is self-closing and that can be forced to open via insertion of an inflation needle 17 to permit air flow into the air chamber 16. The conventional inflatable bladder 10 is disadvantageous in that measuring of an internal pressure of the air chamber 16 is relatively inconvenient as it requires a separate pressure measuring device (not shown).

SUMMARY OF THE INVENTION

Therefore, the object of the present invention is to provide an inflatable bladder with a pressure measuring unit so as to overcome the aforesaid drawback associated with the prior art.

Another object of the present invention is to provide an inflation valve device with a pressure measuring unit for the inflatable bladder of this invention.

According to one aspect of the present invention, there is provided an inflatable bladder that comprises: a bladder peripheral wall that confines an air chamber therein and that is formed with an opening; a tubular sleeve member inserted into the air chamber via the opening and having a sleeve peripheral wall that has opposite open top and bottom ends and that confines a first channel extending from the top end to the bottom end and in fluid communication with the air chamber and the opening, the top end being mounted on the bladder peripheral wall; a pressure measuring unit including a tubular indicator and a first urging member, the indicator being mounted movably in the first channel and having an indicator peripheral wall surrounded by the sleeve peripheral wall and marked with indicia for indicating pressure in the air chamber, the first urging member being disposed between the sleeve peripheral wall and the indicator peripheral wall, the indicator being constantly pushed by the pressure in the air chamber so as to move axially and outwardly of the first channel against biasing action of the first urging member, which, in turn, results in displacement of the first urging member in an amount corresponding to the pressure in the air chamber and indicated by the indicia exposed from the opening in the bladder peripheral wall; and a first locking member which is disposed between the sleeve peripheral wall and the indicator peripheral wall and which is operable between a first locking position, in which, the first locking member releasably engages the indicator so as to prevent axial movement of the indicator in the first channel, and a first unlocking position, in which, the first locking member is disengaged from the indicator so as to permit axial movement of the indicator by virtue of the pressure in the air chamber.

According to another aspect of this invention, there is provided an inflation valve device for an inflatable bladder having a bladder peripheral wall that confines an air chamber therein and that is formed with an opening. The inflation valve device includes: a tubular sleeve member adapted to be inserted into the air chamber via the opening and having a sleeve peripheral wall that has opposite open top and bottom ends and that confines a first channel extending from the top end to the bottom end and adapted to be in fluid communication with the air chamber and the opening, the top end being adapted to be mounted on the bladder peripheral wall; a pressure measuring unit including a tubular indicator and a first urging member, the indicator being mounted movably in the first channel and having an indicator peripheral wall confining a second channel, surrounded by the sleeve peripheral wall, and marked with indicia for indicating pressure in the air chamber, the first urging member being disposed between the sleeve peripheral wall and the indicator peripheral wall, the indicator being adapted to be constantly pushed by the pressure in the air chamber so as to move axially and outwardly of the first channel against biasing action of the first urging member, which, in turn, results in displacement of the first urging member in an amount corresponding to the pressure in the air chamber and indicated by the indicia exposed from the opening in the bladder peripheral wall; a first locking member which is operable between a first locking position, in which, the first locking member releasably engages the indicator so as to prevent axial movement of the indicator in the first channel, and a first unlocking position, in which, the first locking member is disengaged from the indicator so as to permit axial movement of the indicator by virtue of the pressure in the air chamber; an elastomeric first inflation valve that is mounted in and that divides the second channel into an upper section and a lower section which is in fluid communication with the air chamber, and that is formed with a first slit which is capable of self-closing; an inflation needle that is mounted in the upper section of the second channel and that has a needle peripheral wall surrounded by the indicator peripheral wall and confining a first needle chamber which is in fluid communication with the atmosphere, the inflation needle being movable together with the indicator relative to the sleeve member; and a second urging member disposed between the indicator peripheral wall and the needle peripheral wall. The inflation needle is operable via an external force to move inwardly of the inflatable bladder relative to the indicator against biasing action of the second urging member from an upper position to a lower position, in which, the inflation needle extends into and through the first slit so as to permit fluid communication between the air chamber and the first needle chamber via the lower section of the second channel. The second urging member urges the inflation needle to return to the upper position when the inflation needle is relieved from the external force.

BRIEF DESCRIPTION OF THE DRAWINGS

In the drawings which illustrate embodiments of the invention.

DETAILED DESCRIPTION OF THE PREFERRED EMBODIMENTS

Figure 1:
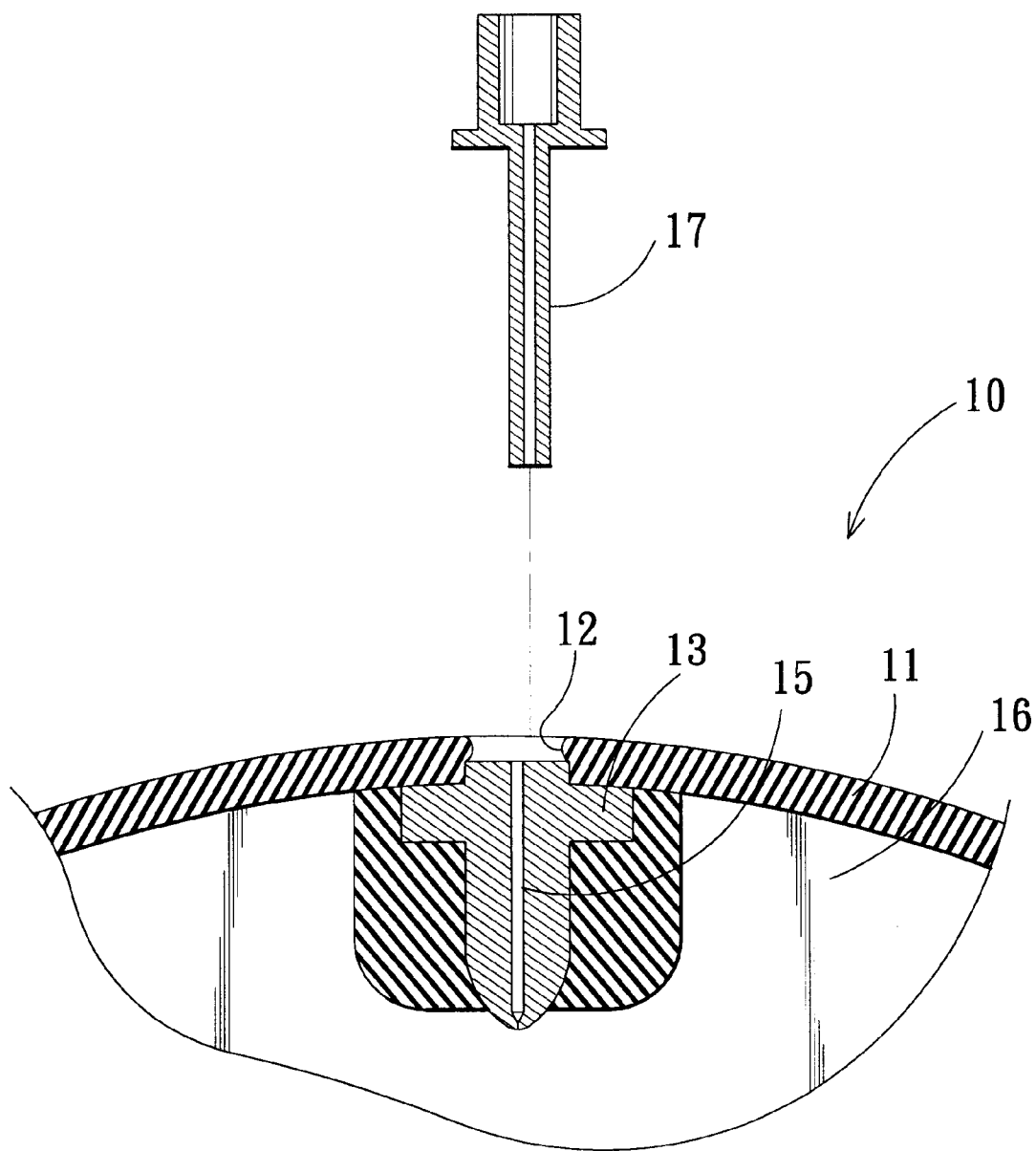
FIG. 1 is a fragmentary sectional view of a conventional inflatable bladder.

FIGS. 2 to 5 illustrate a first preferred embodiment of an inflatable bladder according to this invention, such as a sports ball.

The inflatable bladder includes a bladder peripheral wall 20 that confines an air chamber 200 therein and that is formed with an opening 201, and an inflation valve device 2 mounted in the air chamber 200 via the opening 201.

The inflation valve device 2 includes: a tubular sleeve member 21 inserted into the air chamber 200 via the opening 201 and having a sleeve peripheral wall 21' that has opposite open top and bottom ends 212, 217 and that confines a first channel 210 extending from the top end 212 to the bottom end 217 and in fluid communication with the air chamber 200 and the opening 201, the top end 212 being mounted on the bladder peripheral wall 20; a pressure measuring unit including a tubular indicator 22 and a first urging member 29, the indicator 22 being mounted movably in the first channel 210 and having an indicator peripheral wall 22' confining a second channel 220 surrounded by the sleeve peripheral wall 21' and marked with indicia (see FIG. 3) for indicating pressure in the air chamber 200, the first urging member 29 being disposed between the sleeve peripheral wall 21' and the indicator peripheral wall 22', the indicator peripheral wall 22' having a top end 224 and a bottom end 225 that is constantly pushed by the pressure in the air chamber 200 so as to permit the indicator 22 to move axially and outwardly of the first channel 210 against biasing action of the first urging member 29, which, in turn, results in displacement of the first urging member 29 (see FIG. 4) in an amount corresponding to the pressure in the air chamber 200 and indicated by the indicia exposed from the opening 201 in the bladder peripheral wall 20, the indicator peripheral wall 22' being formed with a needle-guiding flange 222 projecting radially therefrom into the second channel 220 and defining a needle through-hole 2220; a first locking member 30 which is disposed between the sleeve peripheral wall 21' and the indicator peripheral wall 22' and which is operable between a first locking position (see FIG. 2), in which, the first locking member 30 releasably engages the indicator 22 so as to prevent axial movement of the indicator 22 in the first channel 210, and a first unlocking position (see FIGS. 3 and 4), in which, the first locking member 30 is disengaged from the indicator 22 so as to permit axial movement of the indicator 22 by virtue of the pressure in the air chamber 200; an elastomeric first inflation valve 23 that is mounted in the second channel 220 by securing to a bottom end of the needle-guiding flange 222, that divides the second channel 220 into an upper section 2201 and a lower section 2202 which is in fluid communication with the air chamber 200, and that is formed with a first slit 230 which is capable of self-closing; an inflation needle 24 that is mounted in the upper section 2201 of the second channel 220 and that has a needle peripheral wall 24' surrounded by the indicator peripheral wall 22', inserted fittingly and movably through the needle through-hole 2220 and into the first inflation valve 23, and confining a first needle chamber 240 which is in fluid communication with the atmosphere, the inflation needle 24 being movable together with the indicator 22 relative to the sleeve member 21, the needle peripheral wall 24' being formed with a first spring-abutting flange 242 projecting radially 15 therefrom into the upper section 2201 of the second channel 220; and a second urging member 26, which is in the form of a coil spring, disposed between the indicator peripheral wall 22' and the needle peripheral wall 24' within the upper section 2201 of the second channel 220, sleeved around the needle peripheral wall 24', and abutting against the first spring-abutting flange 242 and a top end of the needle-guiding flange 222. The inflation needle 24 is operable via an external force to move inwardly of the inflatable bladder relative to the indicator 22 against biasing action of the second urging member 26 from an upper position (see FIG. 2) to a lower position (see FIG. 5), in which, the inflation needle 24 extends into and through the first slit 230 so as to permit fluid communication between the air chamber 200 and the first needle chamber 240 via the lower section 2201 of the second channel 220. The second urging member 26 urges the inflation needle 24 to return to the upper position when the inflation needle 24 is relieved from the external force.

The first locking member 30 includes a pair of opposing first J-shaped grooves 301 formed in the sleeve peripheral wall 21', and a pair of opposing first tongues 302 formed on the indicator peripheral wall 22' and releasably and respectively engageable with the first J-shaped grooves 301 when the first locking member 30 is positioned at the first locking position. The indicator 22 is rotatable relative to the sleeve member 21 for moving the first locking member 30 between the first locking and unlocking positions.

A sealing member 28 is disposed between the sleeve peripheral wall 21' and the indicator peripheral wall 22' so as to form a seal therebetween and so as to divide the first channel 210 into upper and lower sections 2101, 2102. A pair of opposing second spring-abutting flanges 211, 221 are respectively formed on the sleeve peripheral wall 21' and the indicator peripheral wall 22' within the upper section 2101 of the first channel 210. The first urging member 29, which is in the form of a coil spring, is sleeved on the indicator peripheral wall 22', is disposed in the upper section 2101 of the first channel 210, and abuts against the second spring-abutting flanges 211, 221. The lower section 2102 of the first channel 210 is in fluid communication with the air chamber 200 via a bottom opening in the bottom end 217 of the sleeve peripheral wall 21'.

An elastomeric T-shaped cap member 27 defines a central through-hole 270, and has a head portion 272 and a stem portion 273 that extends from the head portion 272 and that is snugly inserted into a gap confined by the top end 224 of the indicator peripheral wall 22' and a top end 244 of the needle peripheral wall 24'. An operating groove 271 is formed in the head portion 272 of the cap member 27 (see FIG. 3) so as to facilitate rotation of the indicator 22 relative to the sleeve member 21. The top end 244 of the needle peripheral wall 24' extends through the central through-hole 270 so as to facilitate pushing operation of the inflation needle 24. An elastomeric sleeve 25 is inserted fittingly into the top end 244 of the inflation needle 24 for receiving an external inflation needle 17 during inflation operation of the inflatable bladder (see FIG. 5).

Figure 2:
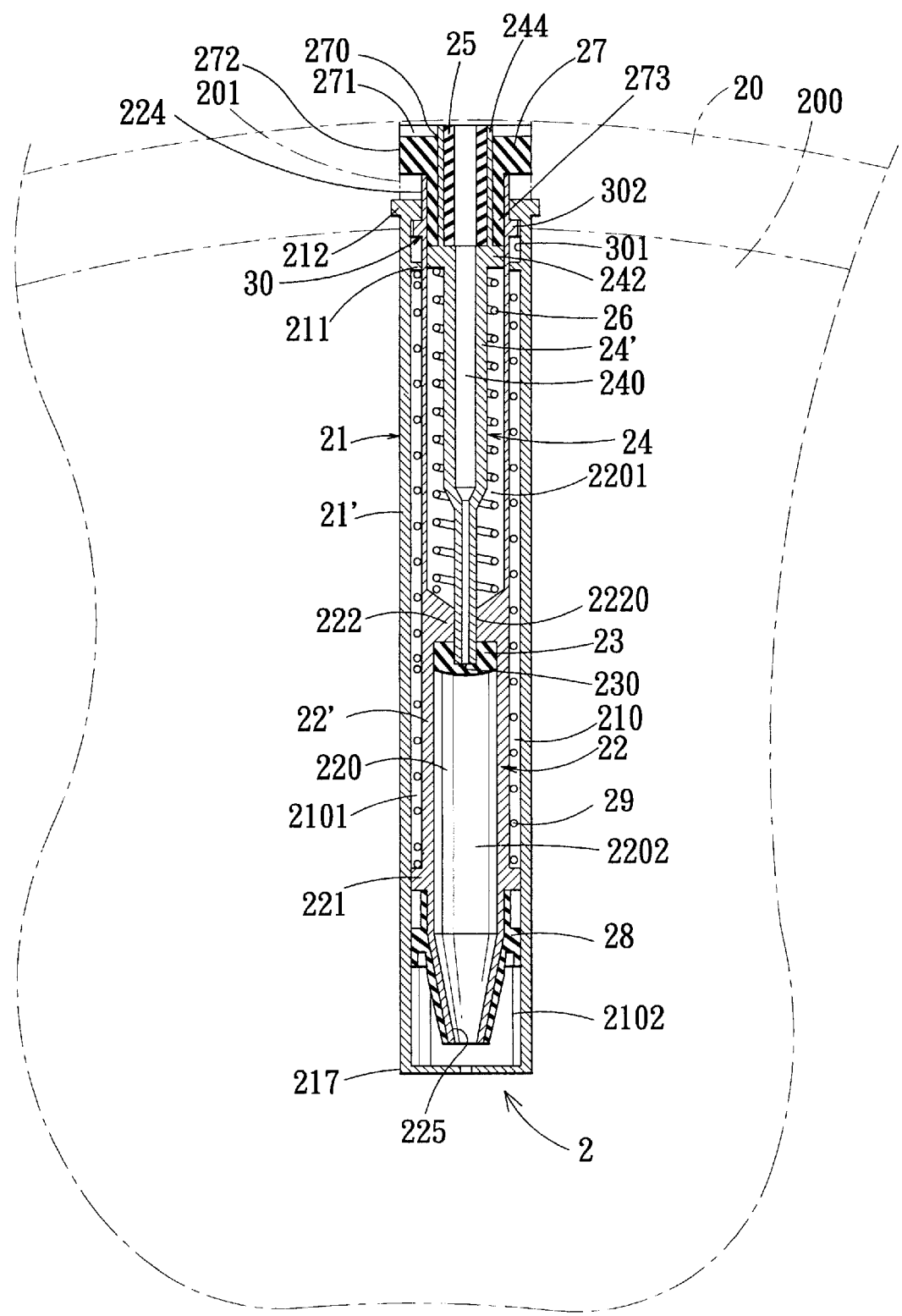
FIG. 2 is a fragmentary sectional view of a first preferred embodiment of an inflatable bladder according to this invention.
Figure 3:
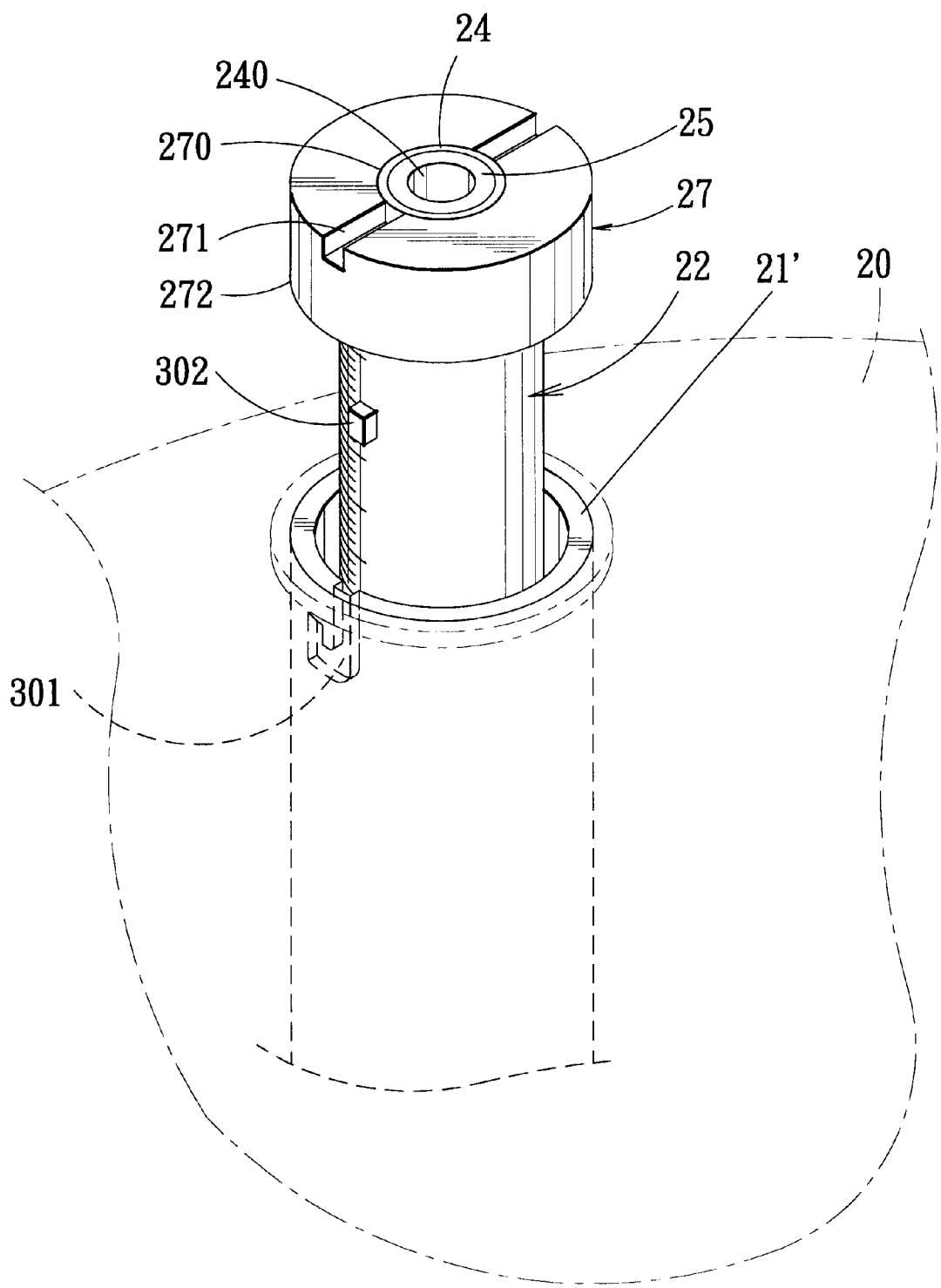
FIG. 3 is a fragmentary top view to illustrate a first locking member of the inflatable bladder of FIG. 2.
Figure 4:
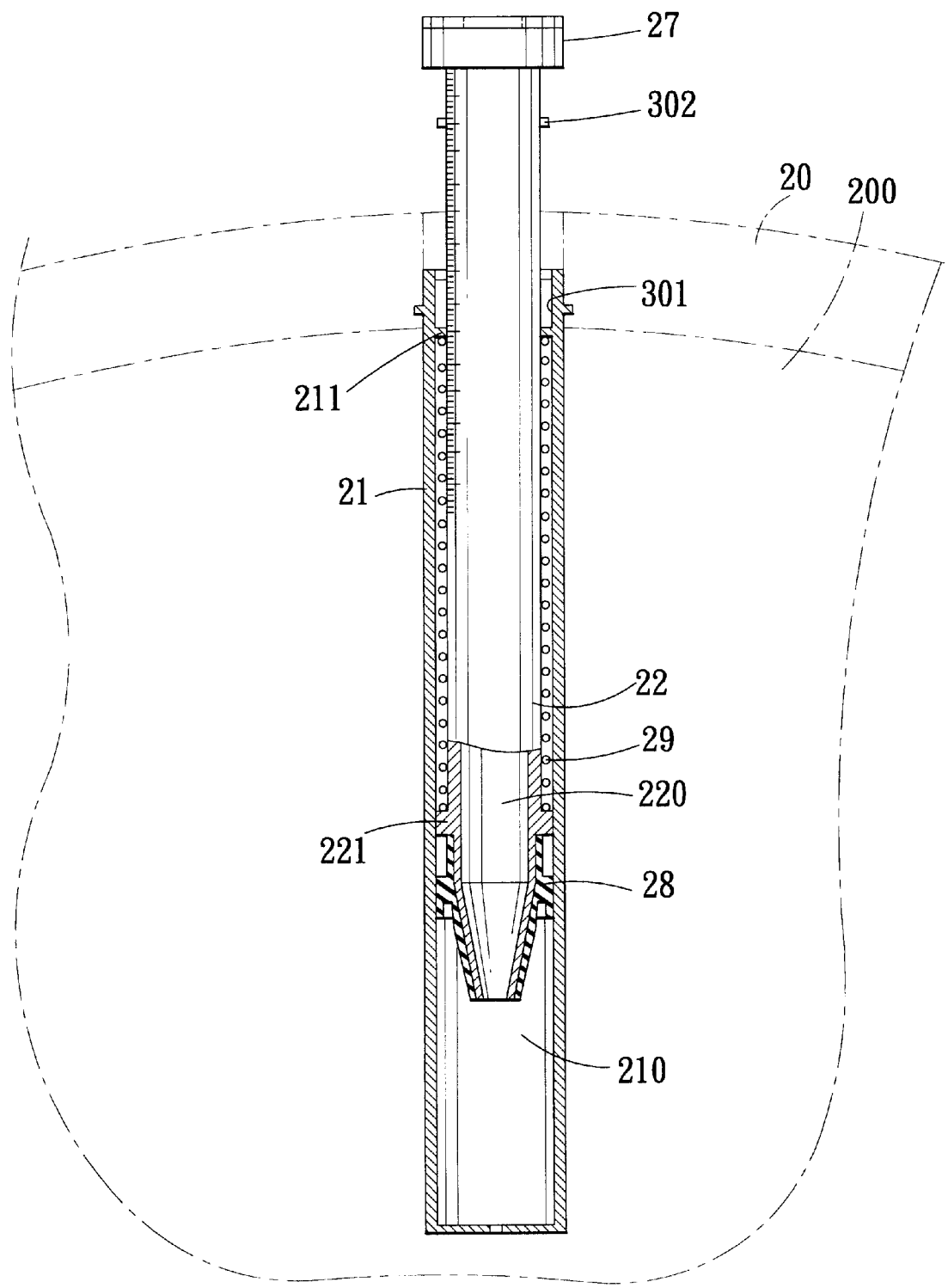
FIG. 4 is a fragmentary partly sectional view to illustrate an indicator of the inflatable bladder of FIG. 2, with the first locking member disposed at a first unlocking position.
Figure 5:
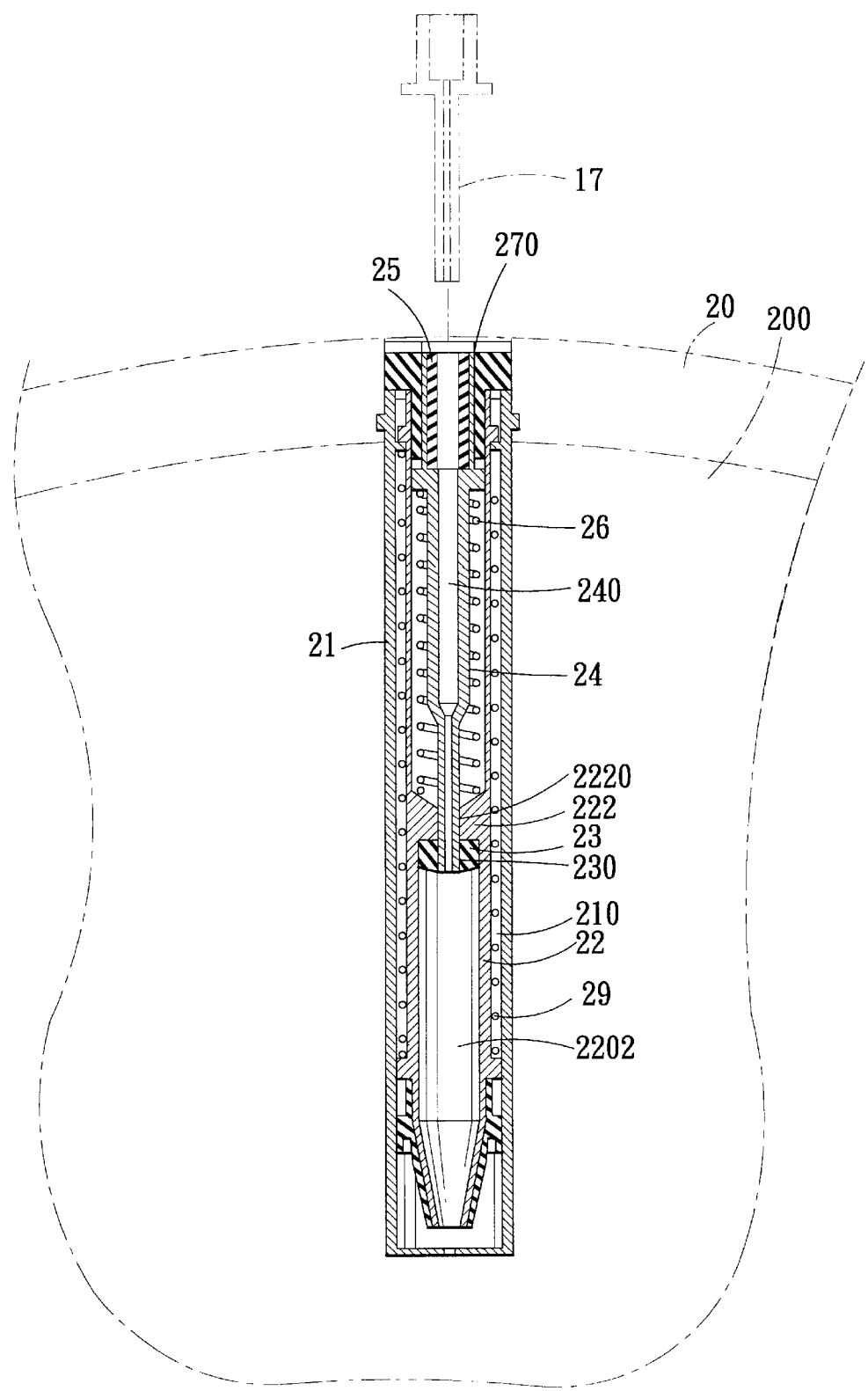
FIG. 5 is a fragmentary sectional view to illustrate an inflation needle of the inflatable bladder of FIG. 2, which is disposed at a lower position.
Figure 6:
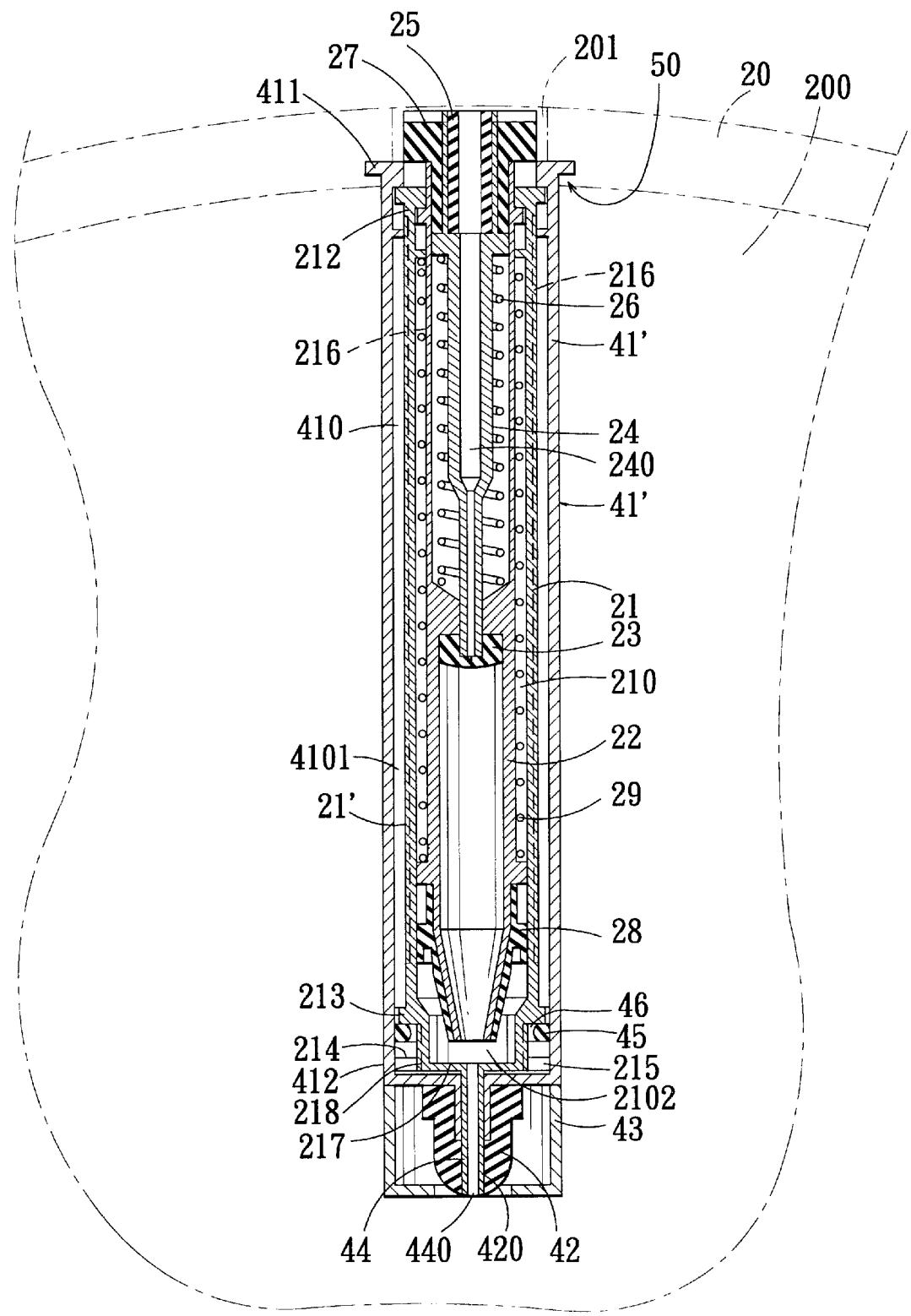
FIG. 6 is a fragmentary sectional view of a second preferred embodiment of the inflatable bladder according to this invention.
Figure 7:
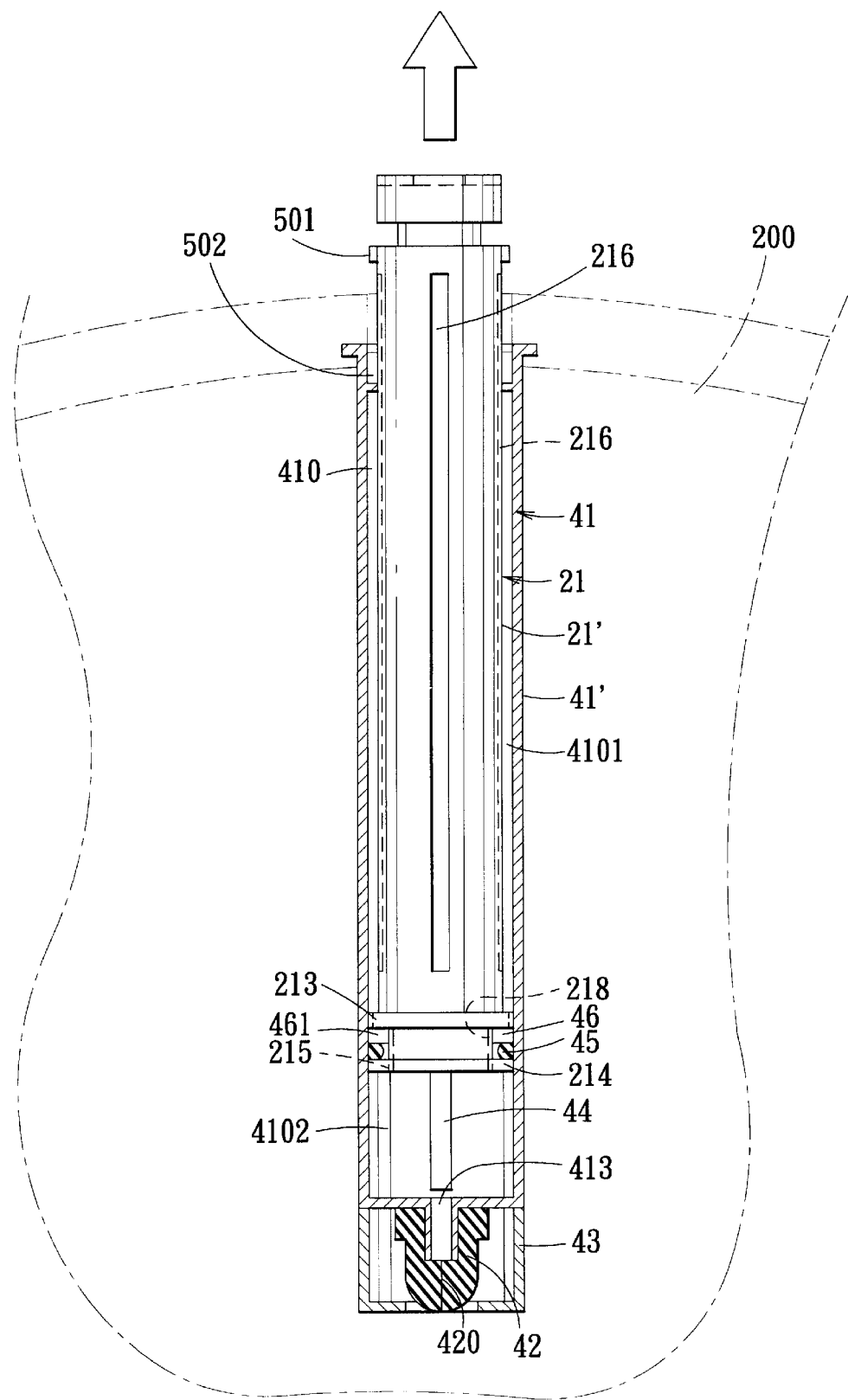
FIG. 7 is a fragmentary partly sectional view to illustrate a sleeve member of the inflatable bladder of FIG. 6, which is moved outwardly of a cylinder.
Figure 8:
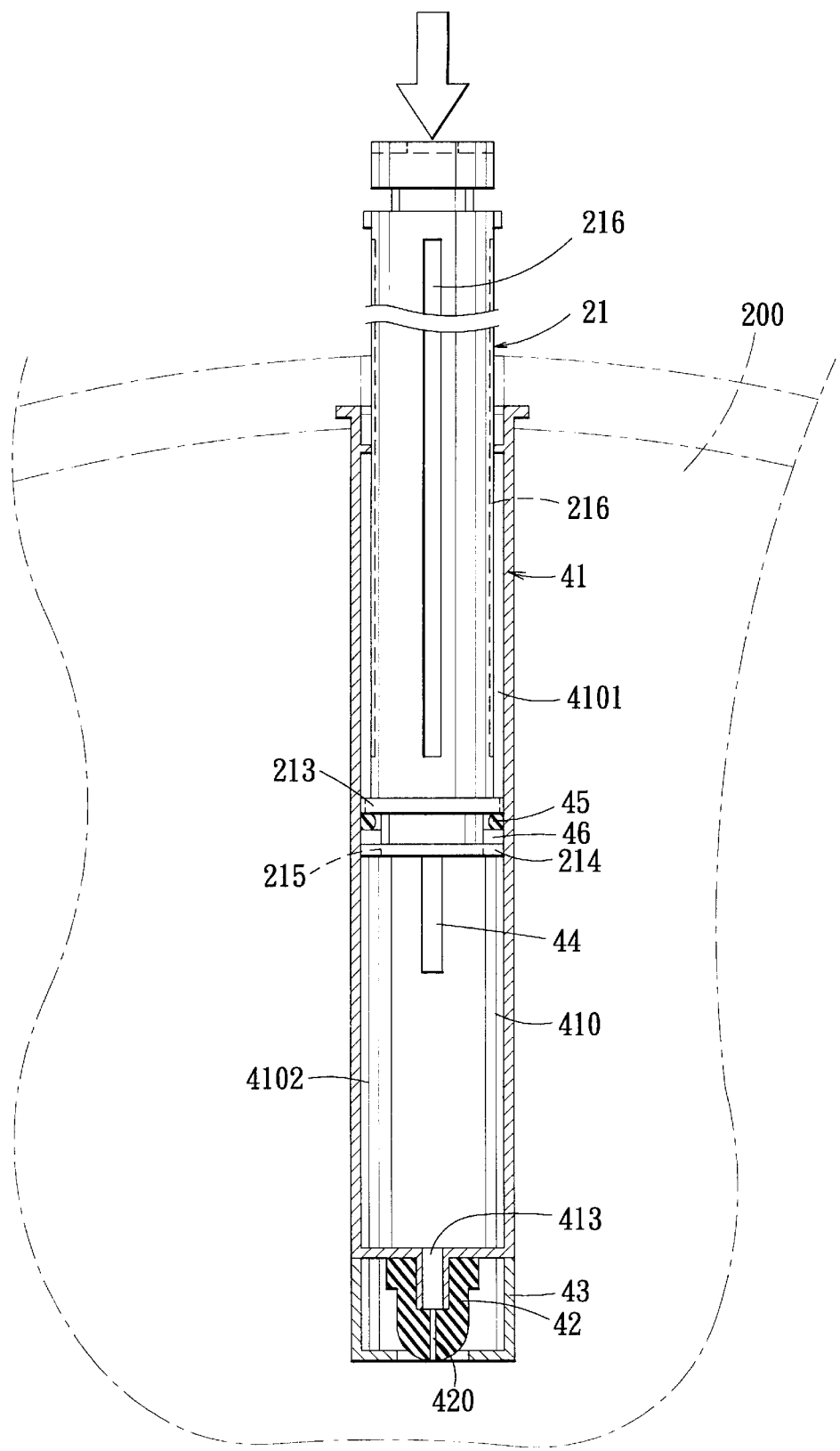
FIG. 8 is fragmentary partly sectional view to illustrate the sleeve member of the inflatable bladder of FIG. 6, which is moved inwardly of the cylinder.

FIGS. 6 to 8 illustrate a second preferred embodiment of the inflatable bladder that is modified from the previous embodiment shown in FIG. 2 and that further includes a hollow cylinder 41 in addition to all of the components of the previous embodiment. In this embodiment, the hollow cylinder 41 is inserted into the air chamber 200 via the opening 201 and has a cylinder peripheral wall 41' that surrounds the sleeve peripheral wall 21', that confines a cylinder chamber 410, and that has an open top end 411 secured to the bladder peripheral wall 20 (note that the top end 212 of the sleeve peripheral wall 21' is secured to the bladder peripheral wall 20 in the previous embodiment but not in this embodiment), and a bottom end 412 opposite to the open top end 411 and formed with a needle-inserting hole 413. An elastomeric second inflation valve 42 is mounted on the bottom end 412 of the cylinder peripheral wall 41', and is formed with a second slit 420 which extends inwardly of the inflatable bladder from the needle-inserting hole 413 and which is capable of self-closing. The lower section 2102 of the first channel 210 is in fluid communication with the air chamber 200 via the needle-inserting hole 413 and the second slit 420. The sleeve peripheral wall 21' is formed with opposing upper and lower annular flanges 213, 214 that project radially and outwardly therefrom toward the cylinder peripheral wall 41' adjacent to the bottom end 217 of the sleeve peripheral wall 21' and that cooperate with the sleeve peripheral wall 21' to confine a ring-retention groove 46 thereamong, and at least one elongated groove 216 extending from the top end 212 of the sleeve peripheral wall 21' toward the upper annular flange 213 and in fluid communication with the atmosphere. An O-ring 45 is retained in the ring-retention groove 46 so as to form a seal between the sleeve peripheral wall 21' and the cylinder peripheral wall 41' and so as to divide the cylinder chamber 410 into an upper space 4101 above the ring-retention groove 46 and a lower space 4102 below the ring-retention groove 46 (see FIGS. 7 and 8). The lower annular flange 214 has a peripheral edge, and is formed at least one notch 215 extending radially from the peripheral edge toward the sleeve peripheral wall 21'. The sleeve peripheral wall 21' has a section that confines an inner side of the ring-retention groove 46 and that is formed with at least one axial groove 218 which is in fluid communication with the notch 215. The sleeve member 21 is movable inwardly and outwardly of the cylinder 41 in such a manner that the O-ring 45 is spaced apart from the upper annular flange 213 by a gap 461 (see FIG. 7) so as to permit fluid communication between the upper and lower spaces 4101, 4102 of the cylinder chamber 41 via the gap 461, the axial groove 218 and the notch 215 when the sleeve member 21 is moved outwardly of the cylinder 41, and that the O-ring 45 abuts against the upper annular flange 213 so as to form a seal between the upper space 4101 of the cylinder chamber 410 and the axial groove 218 when the sleeve member 21 is moved inwardly of the cylinder 41. The second slit 420 is forced to open when the sleeve member 21 is moved inwardly of the cylinder 41 (see FIG. 8), thereby permitting pumping of air from the cylinder chamber 410 into the air chamber 200 via the second slit 420. A protection cover 43 projects from the bottom end 412 of the cylinder peripheral wall 41' for covering the second inflation valve 42.

A second locking member 50 is disposed between the cylinder peripheral wall 41' and the sleeve peripheral wall 21', and is operable between a second locking position (see FIG. 6), in which, the second locking member 50 releasably engages the sleeve member 21 so as to prevent axial movement of the sleeve member 21 in the cylinder chamber 410, and a second unlocking position (see FIGS. 7 and 8), in which, the second locking member 50 is disengaged from the sleeve member 21 so as to permit axial movement of the sleeve member 21.

The second locking member 50 includes a pair of opposing second J-shaped grooves 502 formed in the cylinder peripheral wall 41', and a pair of opposing second tongues 501 formed on the sleeve peripheral wall 21' and releasably and respectively engageable with the second J-shaped grooves 502 when the second locking member 50 is positioned at the second locking position. The sleeve member 21 is rotatable relative to the cylinder 41 for moving the second locking member 50 between the second locking and unlocking positions.

The sleeve peripheral wall 21' is further formed with an air-releasing needle 44 that projects from the bottom end 217 of the sleeve peripheral wall 21' and that defines a second needle chamber 440 which is in fluid communication with the lower section 2102 of the first channel 210. The air-releasing needle 44 extends through the needle-inserting hole 413 and the second slit 420 when the bottom end 217 of the sleeve peripheral wall 21' is moved to the bottom end 412 of the cylinder peripheral wall 41', thereby permitting fluid communication between the air chamber 200 and the lower section 2102 of the first channel 210 via the second needle chamber 440 (see FIG. 6), which, in turn, permits fluid communication between the air chamber 200 and the first needle chamber 240 when the inflation needle 24 is positioned at the lower position, and which, in turn, permits release of air from the air chamber 200 into the atmosphere when the pressure in the air chamber 200 is too high.

With the inclusion of the pressure measuring unit in the inflation valve device 2 of this invention, the aforesaid drawback of the prior art can be eliminated.

With the invention thus explained, it is apparent that various modifications and variations can be made without departing from the spirit of the present invention. It is therefore intended that the invention be limited only as recited in the appended claims.

I claim:

1. An inflatable bladder comprising:

a bladder peripheral wall that confines an air chamber therein and that is formed with an opening;

a tubular sleeve member inserted into said air chamber via said opening and having a sleeve peripheral wall that has opposite open top and bottom ends and that confines a first channel extending from said top end to said bottom end and in fluid communication with said air chamber and said opening, said top end being mounted on said bladder peripheral wall;

a pressure measuring unit including a tubular indicator and a first urging member, said indicator being mounted movably in said first channel and having an indicator peripheral wall surrounded by said sleeve peripheral wall and marked with indicia for indicating pressure in said air chamber, said first urging member being disposed between said sleeve peripheral wall and said indicator peripheral wall, said indicator being constantly pushed by the pressure in said air chamber so as to move axially and outwardly of said first channel against biasing action of said first urging member, which, in turn, results in displacement of said first urging member in an amount corresponding to the pressure in said air chamber and indicated by the indicia exposed from said open in said bladder peripheral wall; and a first locking member which is disposed between said sleeve peripheral wall and said indicator peripheral wall and which is operable between a first locking position, in which, said first locking member releasably engages said indicator so as to prevent axial movement of said indicator in said first channel, and a first unlocking position, in which, said first locking member is disengaged from said indicator so as to permit axial movement of said indicator by virtue of the pressure in said air chamber, wherein said indicator peripheral wall confines a second channel, said inflatable bladder further comprising an elastomieric first inflation valve that is mounted in and that divides said second channel into an upper section and a lower section which is in fluid communication with said air chamber, and that is formed with a first slit which is capable of self-closing, said inflatable bladder further comprising an inflation needle that is mounted in said upper section of said second channel, that is movable together with said indicator relative to said sleeve member, and that has a needle peripheral wall surrounded by said indicator peripheral wall and confining a first needle chamber which is in fluid communication with the atmosphere, and a second urging member disposed between said indicator peripheral wall and said needle peripheral wall, said inflation needle being operable via an external force to move inwardly of said inflatable bladder relative to said indicator against biasing action of said second urging member from an upper position to a lower position, in which, said inflation needle extends into and through said first slit so as to permit fluid communication between said air chamber and said first needle chamber via said lower section of said second channel, said second urging member urging said inflation needle to return to the upper position when said inflation needle is relieved from the external force.

2. The inflatable bladder of claim 1, wherein said first locking member includes a pair of opposing first J-shaped grooves formed in said sleeve peripheral wall, and a pair of opposing first tongues formed on said indicator peripheral wall and releasably and respectively engageable with said first J-shaped grooves when said first locking member is positioned at the first locking position, said indicator being rotatable relative to said sleeve member for moving said first locking member between the first locking and unlocking positions.

3. The inflatable bladder of claim 1, further comprising a sealing member disposed between said sleeve peripheral wall and said indicator peripheral wall so as to form a seal therebetween and so as to divide said first channel into upper and lower sections, said first urging member being disposed in said upper section of said first channel, said lower section of said first channel being in fluid communication with said air chamber.

4. The inflatable bladder of claim 3, further comprising a hollow cylinder inserted into said air chamber via said opening and having a cylinder peripheral wall that surrounds said sleeve peripheral wall, that confines a cylinder chamber, and that has an open top end secured to said bladder peripheral wall, and a bottom end opposite to said open top end and formed with a needle-inserting hole, said inflatable bladder further comprising an elastomeric second inflation valve that is mounted on said bottom end of said cylinder peripheral wall and that is formed with a second slit which extends inwardly of said inflatable bladder from said needle-inserting hole and which is capable of self-closing, said lower section of said first channel being in fluid communication with said air chamber via said needle-inserting hole and said second slit, said sleeve peripheral wall being formed with opposing upper and lower annular flanges that project radially and outwardly therefrom toward said cylinder peripheral wall adjacent to said bottom end of said sleeve peripheral wall and that cooperate with said sleeve peripheral wall to confine a ring-retention groove thereamong, and at least one elongated groove extending from said top end of said sleeve peripheral wall toward said upper annular flange and in fluid communication with the atmosphere, said inflatable bladder further comprising an O-ring retained in said ring-retention groove so as to form a seal between said sleeve peripheral wall and said cylinder peripheral wall and so as to divide said cylinder chamber into an upper space above said ring-retention groove and a lower space below said ring-retention groove, said lower annular flange having a peripheral edge and being formed at least one notch extending radially from said peripheral edge toward said sleeve peripheral wall, said sleeve peripheral wall having a section that confines an inner side of said ring-retention groove and that is formed with at least one axial groove which is in fluid communication with said notch, said sleeve member being movable inwardly and outwardly of said cylinder in such a manner that said O-ring is spaced apart from said upper annular flange by a gap so as to permit fluid communication between said upper and lower spaces of said cylinder chamber via said gap, said axial groove and said notch when said sleeve member is moved outwardly of said cylinder, and that said O-ring abuts against said upper annular flange so as to form a seal between said upper space of said cylinder chamber and said axial groove when said sleeve is moved inwardly of said cylinder, said second slit being forced to open when said sleeve is moved inwardly of said cylinder, thereby permitting pumping of air from said cylinder chamber into said air chamber via said second slit.

5. The inflatable bladder of claim 4, further comprising a second locking member which is disposed between said cylinder peripheral wall and said sleeve peripheral wall and which is operable between a second locking position, in which, said second locking member releasably engages said sleeve member so as to prevent axial movement of said sleeve member in said cylinder chamber, and a second unlocking position, in which, said second locking member is disengaged from said sleeve member so as to permit axial movement of said sleeve member.

6. The inflatable bladder of claim 5, wherein said second locking member includes a pair of opposing second J-shaped grooves formed in said cylinder peripheral wall, and a pair of opposing second tongues formed on said sleeve peripheral wall and releasably and respectively engageable with said second J-shaped grooves when said second locking member is positioned at the second locking position, said sleeve member being rotatable relative to said cylinder for moving said second locking member between the second locking and unlocking positions.

7. The inflatable bladder of claim 6, wherein said sleeve peripheral wall is further formed with an air-releasing needle that projects from said bottom end of said sleeve peripheral wall and that defines a second needle chamber which is in fluid communication with said lower section of said first channel, said air-releasing needle extending through said needle-inserting hole and said second slit when said bottom end of said sleeve peripheral wall is moved to said bottom end of said cylinder peripheral wall, thereby permitting fluid communication between said air chamber and said lower section of said first channel via said second needle chamber, which, in turn, permits fluid communication between said air chamber and said first needle chamber when said inflation needle is positioned at the lower position.

* * * * *